United States Patent [19]
Rhee et al.

[11] Patent Number: 5,478,922
[45] Date of Patent: Dec. 26, 1995

[54] PROCESS FOR POST REACTOR PURGING OF RESIDUAL MONOMERS FROM SOLID POLYMER RESINS

[75] Inventors: Aaron S. Rhee, Belle Mead; Duan-Fan Wang, Somerville, both of N.J.

[73] Assignee: Union Carbide Chemicals & Plastics Technology Corporation, Danbury, Conn.

[21] Appl. No.: 272,099

[22] Filed: Jul. 8, 1994

[51] Int. Cl.$^6$ .................................................... C08F 6/28
[52] U.S. Cl. ........................................................ 528/483
[58] Field of Search .......................................... 528/483

[56] References Cited

U.S. PATENT DOCUMENTS

| | | | |
|---|---|---|---|
| 3,450,183 | 6/1969 | Hinton | 159/2 |
| 3,594,356 | 7/1971 | Hinton | 260/88.2 |
| 4,197,399 | 4/1980 | Noel et al. | 528/500 |
| 4,372,758 | 2/1983 | Bobst et al. | 528/483 |
| 5,292,863 | 3/1994 | Wang | 528/483 |

FOREIGN PATENT DOCUMENTS

| | | |
|---|---|---|
| 0059080 | 5/1986 | European Pat. Off. . |

Primary Examiner—Joseph L. Shofer
Assistant Examiner—Tom Weber
Attorney, Agent, or Firm—B. L. Deppenbrock

[57] ABSTRACT

A process for removing unpolymerized monomers from a solid olefin polymer containing the monomers by countercurrently feeding an inert purge gas through a bed of polymer in a cylindrical purge vessel having tapered walls wherein the vessel has a height to bottom diameter ratio of 0.5:1 to 10:1 and the walls have a tapered angle based on a vertical axis of 0.5 to 15 degrees. An apparatus for removing unpolymerized monomers from a solid olefin polymer containing the monomers which comprises, a cylindrical purge vessel having tapered walls wherein the vessel has a height to bottom diameter ratio of 0.5:1 to 10:1 and the walls have a tapered angle based on a vertical axis of 0.5 to 15 degrees; a solids inlet disposed in an upper portion of the vessel; a solids discharge disposed in a lower portion of the vessel; gas entry means disposed within or below a bed of solids, and gas discharge means disposed in the upper portion of the vessel.

8 Claims, 1 Drawing Sheet

5,478,922

PROCESS FOR POST REACTOR PURGING OF RESIDUAL MONOMERS FROM SOLID POLYMER RESINS

BACKGROUND OF THE INVENTION

1. Field of the Invention

The present invention relates to a process and apparatus for removing unpolymerized monomers from solid olefin polymers. Particularly, the invention relates to a process for removing unpolymerized hydrocarbon monomers from a granular polymer of ethylene and/or propylene and one or more $C_4$ to $C_8$ alpha olefins. More particularly, the invention relates to a process for the removal of unpolymerized hydrocarbon monomers from "sticky polymers" such as ethylene propylene diene terpolymers.

2. Description of the Prior Art

It has long been known that olefins such as ethylene can be polymerized by contacting them under polymerization conditions with a catalyst comprising a transition metal compound, e.g., titanium tetrachloride and a cocatalyst or activator, e.g., an organometallic compound such a triethyl aluminum. Catalysts of this type are generally referred to as Ziegler catalysts.

The resulting granular polymers produced from these processes usually contain residual gaseous or liquid unpolymerized monomers including hydrocarbon monomers. These monomers should be removed from the granular resin for safety reasons, since there is a danger of explosion if the hydrocarbon monomer concentration becomes excessive in the presence of oxygen. In addition, proper disposal of the hydrocarbon is required in order to meet environmental standards concerning hydrocarbon emissions.

The prior art teaches techniques for removing volatile unpolymerized monomers from polymers of the corresponding monomers. See, for example, U.S. Pat. Nos. 4,197,399; 3,594,356, and 3,450,183, in which a columnar (or straight cylindrical) vessel is used as a purger.

U.S. Pat. No. 4,372,758, discloses a degassing or purging process for removing unpolymerized gaseous monomers from solid olefin polymers. The purging process generally comprises conveying the solid polymer (e.g., in granular form) to a column-shaped purge vessel and contacting the polymer in the purge vessel with a countercurrent inert gas purge stream to strip away the monomer gases which are evolved from the polymer. Purging efficiency of this countercurrent plug flow purger normally increases with the increase of the superficial velocity of the purge gas. However, if the gas velocity exceeds the minimum bubbling velocity ($U_{mb}$) of the granular resin to be purged, the purger becomes a bubbling fluidized bed and there occur not only backmixing of purged and unpurged granular resin but also bypassing of purge gas, as bubbles, through the bed without having contact with the granular resin. These normally result in a substantially reduced purging efficiency for continuous mode operation of the purger. To avoid bubbling flow in the purger, therefore, the columnar purger is normally operated at a relatively low superficial gas velocity, below the minimum bubbling velocity of the resin. When the purger is operated at such low superficial gas velocities, however, the process tends to have uneven gas distribution in the purger. Purge gas seems to bypass through certain channels without contact with the majority of solids. This also results in a poor purging performance. This poor solid-gas contact phenomena in the conventional packed bed process may be one reason why actual purging is at least one order of magnitude worse than theoretical predictions.

Further, when producing certain types of ethylene polymers, such as ethylene propylene diene terpolymers and "sticky polymers", monomers such as ethylidenenorbornene (ENB) remaining in the product must be substantially purged from the product due to cost and environmental considerations. However ENB has a significantly low diffusivity as compared to other monomers. If a conventional columnal packed bed process is used, it would require an impractically long residence time or an extra large amount of purge gas. It is clear that such a process is not entirely suitable for ENB purging.

U.S. Pat. No. 5,292,863, ameliorates this problem by providing a process for removing unpolymerized gaseous monomers from a solid olefin polymer by utilizing a column-shaped purge vessel provided with a gas permeable, solids impermeable constraint means. An inert feed gas is fed to the purge vessel and in countercurrent contact with the polymer, the inert purge gas being utilized in an amount and at a velocity sufficient to form a fully expanded bed in the purge vessel. Although this process overcomes many disadvantages incident to prior art techniques, it is not the simplest process, since the process requires the use of a gas permeable, solids impermeable constraint means to confine solids and suppress bubbling fluidization.

Accordingly, there is a need for a more effective process and apparatus for purging solid olefin polymers. Surprisingly, the present invention is an improvement over existing systems because it affords greater latitude in adjusting or regulating the superficial gas velocity to result in more efficient purging in less time without the use of a gas permeable, solids impermeable constraint means. The process and apparatus of the present invention more effectively provides that individual solid particles in the bed of the purge vessel will be swept by the purge gas and thus offer improved solid-gas contact.

SUMMARY OF THE INVENTION

The present invention provides a process for removing unpolymerized hydrocarbon monomers from a solid olefin polymer which comprises:

(a) countercurrently passing a purge gas through a bed of polymer in a cylindrical purge vessel having tapered walls wherein the vessel has a height to bottom diameter ratio of 0.5:1 to 10:1 and the walls have a tapered angle based on a vertical axis of 0.5 to 15 degrees;

(b) discharging the gaseous stream containing the monomer out of the vessel; and (c) discharging polymer solids from the vessel.

The present invention also provides an apparatus for removing unpolymerized hydrocarbon monomers from a solid olefin polymer containing the monomers which comprises, a cylindrical purge vessel having tapered walls wherein the vessel has a height to bottom diameter ratio of 0.5:1 to 10:1 and the walls have a tapered angle based on a vertical axis of 0.5 to 15 degrees; a solids inlet disposed in an upper portion of the vessel; a solids discharge disposed in a lower portion of the vessel; gas entry means disposed within or below a bed of solids, and gas discharge means disposed in the upper portion of the vessel.

In a preferred aspect, the process and apparatus of the present invention is directed to the purging of ethylene propylene diene monomer (EPDM) resin to reduce the amount of residual diene monomer such as ethylidenenorbornene (ENB) present in the resin.

BRIEF DESCRIPTION OF THE DRAWING

In FIG. 1, 1 is an inlet conduit for solid polymer entering the vessel for purging; 2 is the discharge end; 3 is a gas distributor plate; 4 is a plurality of tubes in the distributor plate; 5 is a conduit for entering purge gas; 6 is a discharge conduit for purged polymer resin; 7 is a rotary valve; 8 is an inverted truncated cone shaped transition element; 9 is the tapered wall of the vessel; 10 is a cylindrical vessel having tapered walls; and 11 is a conduit for the exiting purge gas conveying the residual monomer.

DETAILED DESCRIPTION OF THE INVENTION

Polymers

Figure 1:
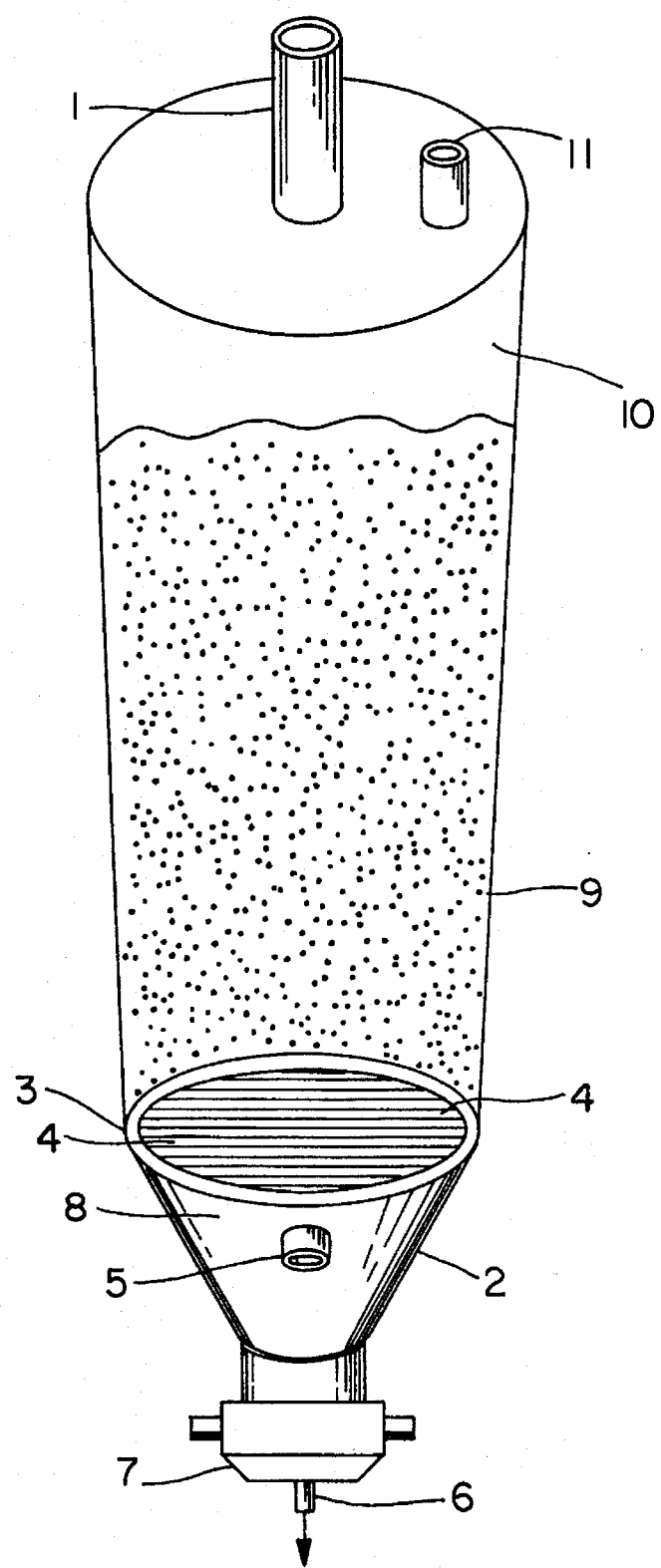
FIG. 1 is a representation of a preferred purge vessel system of the present invention with certain parts broken away to reveal interior details.

The solid olefin polymers to be purged can be produced by a variety of well known techniques. A particularly preferred technique is to produce the solid olefin polymers by a gas phase fluidized bed process which utilizes a fluid bed reactor such as described in U.S. Pat. No. 4,482,687.

Solid olefin polymers which can be purged using the process and apparatus of the present invention are preferably granular. They can include polyolefins or alpha olefins such as, for example, homopolymers of ethylene or propylene; copolymers and terpolymers of a major mole percent of ethylene and/or propylene as the main monomer(s) and a minor mole percent of at least one $C_3$ to $C_8$ alpha olefin; a sticky polymer; as well as polyvinyl chlorides; and elastomers such as polybutadiene, EPMs, and EPDMs. The preferred $C_3$ to $C_8$ alpha olefins are propylene, butene-1, pentene-1, hexene-1, 4-methylpentene-1, heptene-1, and octene-1. This description is not intended to exclude the use of this invention with alpha olefin homopolymer and copolymer resins in which ethylene is not a monomer. Examples of sticky polymers which can be benefited by the present invention include ethylene/propylene rubbers and ethylene/propylene/diene rubbers, polybutadiene rubbers, high ethylene content propylene/ethylene block copolymers, poly(1-butene) (when produced under certain reaction conditions), very low density (low modulus) polyethylenes, i.e., ethylene butene rubbers or hexene containing terpolymers, ethylene/propylene/ethylidene norbornene and ethylene/propylene/hexadiene terpolymers of low density.

For purposes of ease of description only, the present invention will be described herein with particular reference to EPDM terpolymers where applicable, although it is to be expressly understood that the invention is not to be limited thereby. Rather, it is the intention to be limited only by the scope of the claims appended hereto. The invention is preferably practiced with sticky polymers which have been rendered "non-sticky" such as by the process disclosed in U.S. Pat. No. 4,994,534, issued Feb. 19, 1991.

Depending upon the conditions of reaction and the particular diene monomer, the resulting EPDM terpolymer can contain an amount of liquid and/or gaseous unpolymerized hydrocarbon monomers, (which may include ethylene, propylene, and, e.g., ethylidene norbornene). The process and apparatus of the present invention is especially useful for purging higher boiling or liquid monomers such as ethylidene norbornene.

Environmental restrictions may prevent the direct venting to the atmosphere of such residual monomers and more importantly, health and safety considerations generally require that these materials be substantially removed from the solid polymer. The present invention may be employed to accomplish these desired objectives.

Operation of the Purging Process

The process of the present invention is believed to involve only a physical process i.e., the monomers are only entrained or otherwise contained within and between the resin particles and diffuse out into a countercurrent gas purge stream. The diffusion of the monomers into the purge gas occurs until an equilibrium is established between the monomer concentration in the resin and in the purge gas. A large difference between monomer concentrations in the resin and in the purge stream obviously favors a high rate of diffusion. In addition, the rate of diffusion is dependent to a degree upon the temperature and pressure within the purge vessel, with higher temperatures favoring higher diffusion rates and therefore lower residence times in the purge vessel and with lower pressures also favoring higher rates of diffusion. The rate of diffusion also depends on the resin particle size and particle morphology, with the rate being higher for smaller particle sizes. Therefore, depending upon the initial monomer concentration in the resin and the final concentration desired, the residence time of the resin in the purge vessel can be determined using known mass transfer techniques based on the resin temperature, particle size distribution and morphology, rate of flow of purge gas, the pressure in the purge vessel, and the size of the purge vessel. In general for EPDM materials, when processing a particle size of about 0.025 inches average particle size having a temperature of about 60° C. and at a purge gas velocity of about 0.5 ft/second, a residence time on the order of about three hours is generally preferred to reduce the monomer concentration to a safe and environmentally acceptable value. It is preferred to feed to the purge vessel a purge gas which contains as little as possible or no hydrocarbons. Of course, economic considerations also affect the design of the purge vessel. Those skilled in the art will be able to practice the present invention based upon the more detailed discussions contained herein, and using standard chemical engineering techniques.

FIG. 1 illustrates a preferred embodiment of the process of the invention. Referring to FIG. 1, a cylindrical purge vessel 10 is shown which is provided with an entry means such as inlet conduit 1 for a solid polymer (resin) which must be purged and which is introduced into the vessel by gravity. Alternatively, the resin can be introduced into the purge vessel using a conveying gas such as nitrogen. The cylindrical purge vessel has tapered walls 9. The height to bottom diameter ratio of the vessel is 0.5:1 to 10:1, preferably 1.5:1 to 8:1, and most preferably is 4:1 to 7:1. The vessel has tapered or angled walls 9 to accommodate a bed of solids. The cross-sectional area of the vessel increases from the bottom to the top. The angle of the walls 9 is dependent upon the size of polymers to be purged and the amount of purge gas to be used. In general practices, the tapered angle as measured along the vertical axis of the vessel can range from 0.5 to 15 degrees, and preferably is 3 to 10 degrees.

The purge gas, preferably an inert purge gas is introduced into the vessel at its lower end through conduit 5 and is directed through a gas distributing means such as distributor plate 3 which serves to provide uniform purge gas distribution. The gas distributor of choice should allow the solids to be discharged from the bottom of the bed and thus enable the solid bed to be operated in a counter-current mode. As shown in FIG. 1, distributor 3 is positioned at the base of the purge vessel in communication with conduit 5 and at a point slightly above a transition element 8. The transition element has a inverted truncated conical shape and connects the tapered purge vessel to the rotary valve 6. As known to those skilled in the art, the size of the transition element is determined by the bottom diameter of the purge vessel, the size of the rotary valve, and the mass flow. Such elements are readily commercially available. Gas distributor 3 can be provided with transversely extending tubes 4 which have openings through which the purge gas can enter the interior of the purge vessel. The openings and pattern of openings are such as to insure that enough back pressure can be built up so that purge gas is injected through all the openings evenly.

Conventional materials handling equipment and techniques can be employed in the process of the present invention. For example, when a conveying gas is employed instead of gravity, dust collectors can also be utilized. The purpose of the dust collectors is to prevent the resin particles from being carried out of the top of the purge vessel with the exiting purge gas. Conventional dust collectors, such as commercially available bag filters, can be employed. Similarly, conventional coolers and blowers can be employed to provide the necessary materials handling capability and to control the temperature and pressure of resin and purge gas.

Optionally, it is preferred that immediately and adjacent to inlet conduit 1, there is located a conventional collection bin (not shown) for gravitational feeding of the resin. The bin is connected to conduit 1 by means of a rotary valve so that resin may be fed to the purge vessel continuously or intermittently, and, preferably, is fed continuously.

The temperature of the resin in the purge vessel is not critical and is normally dependent upon the temperature at which it is obtained from the polymerization reaction. However, the resin temperature affects the residence times as discussed below. In the case of ethylene copolymers, the resin can be obtained in the form of solid particles directly from the polymerization reaction at a wide reaction temperature such as about 50° C. to 85° C. It is economically desirable not to add additional heat to the resin before feeding the resin to the purge vessel. It is also desirable to keep the resin temperature lower than its softening or melting point. The higher the temperature in the purge vessel, the higher the rate of diffusion of the monomer gases from the solid to the purge gas. However, economic considerations may prevent additional heat from being added to the resins. Satisfactory results can be obtained by directly feeding the resin at its reaction temperature to the purging operation, even considering the fact that its temperature may decrease or increase slightly due to the temperature of the conveying gas.

The inert purge gas is preferably fed to the bottom of the purge vessel at ambient temperature although any temperature up to about the temperature of the resin is acceptable. Pressures utilized can range from below atmospheric pressures to pressures at or in excess of atmospheric pressures up to about 1 atmosphere or greater. Selection of appropriate pressure is primarily dictated by economic considerations and purging efficiency.

The inert purge gas employed in the practice of the present invention can be any gas which is substantially inert both to the resin being purged and the particular gaseous monomers being removed although in certain cases ethylene or other hydrocarbons can be employed. The preferred purge gas is nitrogen although other gases substantially inert in the process can be employed. It is preferred that the nitrogen content of the purge gas be at least about 90% and that oxygen be substantially excluded from the purge gas. The maximum permissible oxygen content varies depending upon the particular hydrocarbon monomer gas being stripped. As the concentration of hydrocarbons increase, the danger of explosion also increases, and this danger level varies with different hydrocarbons. Ideally, there should be no oxygen in the purge gas although a small amount can be tolerated depending upon the hydrocarbon concentration in the purge vessel and the monomers being stripped. Those skilled in the art can easily determine the tolerable oxygen levels given a particular monomer. Of course, the inert purge gas may also include small amounts of the gaseous monomers, although as their concentration increases, their diffusion rate and hence the resin residence time will be affected as discussed above. Other advantages of employing relatively pure nitrogen as a purge gas are that more hydrocarbon gases can be stripped from the resin particles and any pure nitrogen that may be discharged with the exiting resins does not contribute to atmospheric emissions as would gases containing impurities. It is therefore preferred that the purge gas be pure nitrogen.

The inert purge gas is fed to purge the vessel, through conduit 5, thence through distributor 3 and then upward interstitially through the solid polymer granules in the vessel. The purge gas is provided in an amount such that the superficial velocity remains slightly below that of a bubbling fluidized bed. The inert purge gas is discharged from the vessel through discharge port 11. In order to achieve non-bubbling bed operation the superficial velocity of inert purge gas entering the vessel is regulated within certain parameters.

In general, the superficial velocity of inert purge gas entering the purge vessel depends on the particle size of the solid polymer and the angle of the tapered wall. It has been found that the velocity of inert purge gas can range from about 0.05 to about 2 ft/sec, preferably about 0.4 to about 1 ft/sec. When the polymer is an EDPM, it is understood that the particle size is larger than other polymers such as polyethylene and polypropylene. Accordingly, the superficial gas velocity would necessarily be higher or increased to remove diene monomer more efficiently. In general, the superficial gas velocity employed when the polymer is an EDPM ranges from about 0.5 ft/sec to 2 ft/sec.

The rate of flow of resin through the purge vessel is not critical and depends upon the minimum residence time necessary to reduce the concentration of monomers in the resin to the desired level. It is preferred to reduce the hydrocarbon monomer content in the resin to below about 25 to 50 parts per million by weight (ppmw), although the extent to which the hydrocarbon monomer concentration must be reduced depends upon both environmental and safety requirements. For diene rubbers, especially those containing unreacted diene such as ENB, the hydrocarbon monomer content in the resin is below about 100 ppmw. In any event the purging process of the present invention is effective to substantially reduce the dissolved hydrocarbon monomer of the solid olefin polymer.

The purged solid polymers are discharged through gas distributor 3 into a transition element 8 and, thence into rotary valve for discharge from the purging system.

The following examples will further illustrate the invention.

Comparative Example 1: Using a Columnar Purge Vessel

A columnar purge vessel, made of PLEXIGLAS®, having an inner diameter of 6.5 inches and a height of 6 feet was connected to a conical section through which fluidizing gas was introduced. The purge vessel was separated from the transition element section by a distributor plate which was uniformly porous consisting of one perforated stainless steel plate and three layers of fine mesh screens laminated on the obverse of the perforated plate. The diameter of each perforation was 3/64 inches. The perforations had a triangular matrix with a pitch of 5/32 inches. The fine mesh screen was employed to prevent fines in the resin from sifting into the bottom of the bed and to provide a uniform distribution of gas to the bed.

Plant compressed air was used as the fluidizing gas. A flow meter and a valve were used to manually control the air flow rate. The pressure in the bed was slightly higher than the atmospheric pressure.

The granular resin had a weight average particle size of about 0.028 inches. The aerated bulk density of the resin was about 25.18 lbs/ft$^3$. The density of the polymer, measured by using a sample from a plaque, was 0.9180 g/cc. Its melt index, measured at 190° C. with 2.16 kg load, was 1.0 dg/min.

At room temperature, the columnar purge vessel was charged with approximately 11.86 pounds of the granular polymer resin. The bed was fluidized in a bubbling flow regime for about 5 minutes to ensure uniform mixing of the resin in the bed. Then, the air was shut off to have a settled bed. When the bed was fully settled, the bed height was 23.5 inches.

The initial superficial gas velocity (based on a 6.5-inch inner diameter) was set at 0.41 ft/s to observe that the bed height was increased to 26.5 inches but not bubbling flow yet. Thereafter, the gas velocity was increased step-wise by 0.04 ft/s, until the onset of bubbling flow was observed. Approximately 10 minutes were spent at each setting of superficial gas velocity to carefully observe the behavior of the bed as well as to ensure that the bed reached a steady state. For the tested resin, a bubbling flow in a fluidized bed was manifested by the appearance of bubbles at the top surface of the bed and the fluctuation of the top surface, that happened simultaneously. No bubble in the bed, no fluctuation of the top surface of the bed, and no noticeable macroscopic motion of particles were observed up to 0.65 ft/s of gas velocity. However, when the gas velocity was increased to 0.69 ft/s, bubbles started to appear in the bed, the motion of particles became noticeable, and the top surface of the bed started to fluctuate. The average bed height was about 30.25 inches with 0.25 inches of fluctuation. A further increase of the gas velocity to 0.73 ft/s gave complete bubbling flow with backmixing of particles in the bed. The gas velocity was further increased up to 0.81 ft/s and reduced gradually down to 0.69 and 0.65 ft/s. At 0.69 ft/s, the bed was still bubbling, but at 0.65 ft/s, the bubbling flow ceased. Therefore, the minimum bubbling velocity of the tested resin in this columnar bed was 0.69 ft/s.

Example 2: Using a Tapered Purge Vessel

A tapered vessel, made of PLEXIGLAS®, having inner diameters of 6.5 inches at the bottom and 11.5 inches at the top with a tapered angle of about 4.5 degrees from vertical, and a height of 32 inches was used. A straight cylindrical PLEXIGLAS®, having a height of 3 feet and an inner diameter of 11.5 inches was attached to the top of the tapered vessel to control entrainment of fine particles. The tapered vessel was connected to a transition element section at its lower end and a distributor plate as in Example 1.

The tapered vessel was charged with approximately 19.84 pounds of the same polymer granular resin to have the same settled bed height (23.5 inches) as the columnar vessel of Example 1. The same test procedures as described in Example 1 were employed for this test, including the initial value of superficial gas velocity and its step increase thereafter. The superficial gas velocity in this tapered vessel is defined as the velocity based on the cross-sectional area at the bottom of the vessel.

At 1.01 ft/s of superficial gas velocity, the bed height became 26 inches and a very weak and slow bubbling flow occurred at the lower portion of the bed—up to about 9 inches from the distributor plate. No bubbling occurred in the rest of the bed. Very weak and slow particle motion was observed in the bubbling flow region. However, no fluctuation of the top surface of the bed was noticed. At 1.05 ft/s of gas velocity, the bed height became 26.5 inches and this bubbling flow region reached up to 11 inches from the distributor plate. Again, no bubbling occurred in the rest of the bed. The bed maintained this partially-bubbling-flow state up to 1.09 ft/s of superficial gas velocity.

The onset of complete bubbling flow occurred at 1.13 ft/s. At this onset, the whole bed started to exhibit bubbling flow. The average bed height was about 26.5 inches with 0.02 inches of fluctuation of the bed surface.

From Examples 1 and 2, it is clearly seen that the minimum bubbling velocity of the tapered bed over the columnar bed is from 46% (for the onset of partially-bubbling-flow) to 64% (for the onset of complete bubbling flow) higher. In other words, a tapered bed purger can be operated at a substantially higher superficial gas velocity without backmixing of particles than a columnar bed. Therefore, a substantially increased purging efficiency can be obtained by using a tapered bed over a columnar bed.

EXAMPLE 3

This example demonstrates inadequate purging when a straight columnar purger is operated at a superficial gas velocity below the minimum bubbling velocity of a granular resin. The diameter of the purger was 8 inches and the height of the resin bed was maintained at 5 feet.

A batch of an ethylene propylene ethylidenenorbornene terpolymer (EPDM) was prepared by the gas phase process disclosed in U.S. Pat. No. 4,994,534, at a rate of 33 lb/hr. The average particle size was 0.025 inches with a standard deviation equal to 2. The residue of ethylidene-norbornene (ENB) in the EPDM polymer was 0.5 wt. % before any purging took place.

After polymerization, a portion of the granular resin was transferred from the reactor to the purge vessel with a nitrogen conveying gas. The resin was deposited on top of an existing resin bed in the purge vessel operated near atmospheric pressure. The bed level was maintained constant at about 5 feet from the gas distributor by means of a conventional level control device coupled with a rotary valve installed at the bottom of the purge bin. The operation temperature of the purge vessel was kept constant at 60° C.

With a nitrogen flow rate at 19.9 lb/hr., the gas superficial velocity in the purge vessel was 0.24 ft/s. The superficial gas velocity needed to create bubbling flow in this columnar bed of resin having an average particle size of 0.025 inches was about 0.5 ft/s. Since the purge vessel was operated at a superficial gas velocity below the minimum bubbling velocity, there existed no noticeable bubble, nor any solids backmixing in the bed.

After 1.2 hours of purging, there was a failure to reduce the ENB residue from 0.5 wt. % to 100 ppmw. With the purge gas channeling through the upper large section of the purge vessel, the resin in this upper layer of the vessel was not properly swept by the purge gas, and, therefore, was not purged. The concentration of ENB residue in the resin in the upper part of the vessel was the same as the original ENB concentration in the resin transferred from the reactor.

EXAMPLE 4

This example demonstrates inadequate purging when the same columnar purger of Example 3 is operated in a bubbling fluidization mode.

A portion of the ethylene propylene ethylidenenorbornene terpolymer (EPDM) prepared in Example 3 was used in accordance with the procedures in that example. Again, the bed height was maintained constant at about 5 feet and the temperature of the purge vessel was kept constant at about 60° C. With a nitrogen flow rate at about 44.8 lb/hr., the superficial gas velocity in the purge vessel was 0.54 ft/s. This superficial gas velocity was high enough for the resin to form a bubbling flow fluidization in this columnar purge vessel. Bubbles were observed and backmixing of the resin occurred in the vessel.

After 1.2 hours of purging, there was a failure to reduce the ENB residue from 0.5 wt. % to 100 ppmw primarily due to the solids backmixing as well as the bypassing of the purge gas (as bubbles) without having direct contact with the solids. The ENB residue in the resin decreased from the initial value of 0.5 wt % to the final value of about 0.05 wt %.

EXAMPLE 5

This example demonstrates the successful purging of ENB by employing the process and apparatus of the present invention. A tapered purge vessel similar to the one shown in FIG. 1 is used. The diameter of the vessel at its bottom where the gas distributor is located is 8 inches and the tapered angle of the vessel wall is 4 degrees from the axis of the vessel.

A portion of the ethylene propylene ethylidenenorbornene terpolymer (EPDM) prepared in Example 3 is transferred from the reactor to a the purge vessel. The resin is deposited on top of an existing resin bed in the purge vessel which is operated near atmospheric pressure. The bed level is maintained constant at about 5 feet from the gas distributor by means of a conventional level control device coupled to a rotary valve installed at the bottom of the purge bin. The operation temperature of the purge vessel is kept constant at 60° C.

With a nitrogen flow rate at 44.8 lb/hr., the superficial gas velocities are 0.54 and 0.20 ft/s at the bottom and the top of the tapered purger, respectively. The gas velocity at the bottom of the purger is above the minimum bubbling velocity of the resin for a columnar purger (about 0.5 ft/s as shown in Example 3). However, no noticeable bubble, nor any solids backmixing is observed in this tapered purger.

After 1.2 hours of purging, the present operation successfully reduces the ENB residue from 0.5 wt. % to below 100 ppmw. With purge gas sweeping uniformly through the resin bed, the ENB residue in the resin is gradually purged out as the resin travels down the purger.

EXAMPLE 6

This example demonstrates the successful purging of ENB by employing the process and apparatus of the present invention.

A portion of the ethylene propylene ethylidene norbornene terpolymer (EPDM) prepared in Example 3 is transferred from the reactor to the tapered purge vessel described in Example 5. The procedures of Example 5 are followed, except that the purge vessel is operated at about 80° C.

With a nitrogen flow rate at about 40.0 lb/hr., the superficial gas velocities in the purge vessel are 0.5 and 0.19 ft/s at the bottom and the top of the tapered purger, respectively. Although the gas velocity at the bottom of this tapered purger is about the same as the minimum bubbling velocity of the resin for a columnar purger (see Example 3), no noticeable bubble, nor any solids backmixing is observed in this tapered purger.

According to calculated values, after 0.27 hours of purging, the present operation successfully reduces the ENB residue from 0.5 wt % to below 100 ppmw.

EXAMPLE 7

This example demonstrates the successful purging of ENB by employing the process and apparatus of the invention.

A portion of the ethylene propylene ethylidenenorbornene terpolymer (EPDM) prepared in Example 3 is transferred from the reactor to the tapered purge vessel described in Example 5 and processed in accordance with the procedures of that example.

With the nitrogen flow rate of 80.0 lb/hr, the superficial gas velocities are 0.96 and 0.36 ft/s at the bottom and top of the resin bed, respectively. The gas velocity at the bottom of the tapered purger is above the minimum bubbling velocity of the resin for a columnar purger (about 0.5 ft/s as shown in Example 3). However, no noticeable bubble, nor any solids backmixing is observed in this tapered purger.

After 1.0 hours of purging, the present operation successfully reduces the ENB residue from 0.5% to below 100 ppmw.

What is claimed is:

1. A process for removing unpolymerized monomers from a solid olefin polymer containing the monomers which comprises:
   (a) countercurrently passing a purge gas through a bed of polymer in a cylindrical purge vessel having tapered walls, wherein the vessel has a height to bottom diameter ratio of 0.5:1 to 10:1 and the walls have a tapered angle based on a vertical axis of 0.5 to 15 degrees, in an amount and at a velocity sufficient to remove substantially all of the monomers from the polymer;
   (b) discharging the gaseous stream containing the monomer out of the vessel; and
   (c) discharging polymer solids from the vessel.

2. A process according to claim 1 wherein the angle is 3 to 10 degrees.

3. A process according to claim 1 wherein the purge gas is an inert gas.

4. A process according to claim 3 wherein the inert purge gas is fed to the purge vessel at a velocity of about 0.05 to about 2 ft/sec.

5. A process according to claim 4 wherein the inert purge gas is passed through a gas distributor means positioned in the vessel.

6. A process according to claim 5 wherein the polymer is
   (a) a homopolymer of ethylene or propylene;
   (b) a copolymer of a major mole percent of ethylene as the main monomer and a minor mole percent of one or more C3 to C8 alpha olefins;

(c) a copolymer of a major mole percent of propylene and a minor mole percent of one or more C4 to C8 alpha olefins;

(d) a polyvinyl chloride;

(e) a polybutadiene; or (f) a sticky polymer.

7. A process according to claim 6 wherein the alpha olefins are selected from the group consisting of propylene, butene-1, pentene-1, hexene-1, 4-methylpentene-1, heptene-1 and octene-1.

8. A process according to claim 6 wherein the sticky polymer is selected from the group consisting of ethylene propylene rubbers and ethylene propylene diene rubbers, polybutadiene rubbers, high ethylene content propylene ethylene block copolymers, poly(1-butene), ethylene butene rubbers, hexene containing terpolymers, ethylene propylene ethylidenenorbornene and ethylene propylene hexadiene terpolymers.

\* \* \* \* \*